(12) United States Patent
Du et al.

(10) Patent No.: US 7,343,484 B2
(45) Date of Patent: Mar. 11, 2008

(54) PERSONAL COMPUTER INTEGRATED WITH PERSONAL DIGITAL ASSISTANT

(75) Inventors: Sterling Du, Palo Alto, CA (US);
Bruce Denning, Monterey, CA (US);
James Lam, Fremont, CA (US)

(73) Assignee: O2Micro International Limited, Grand Cayman (KY)

( * ) Notice: Subject to any disclaimer, the term of this patent is extended or adjusted under 35 U.S.C. 154(b) by 0 days.

(21) Appl. No.: 10/108,768

(22) Filed: Mar. 28, 2002

(65) Prior Publication Data
US 2003/0188144 A1    Oct. 2, 2003

(51) Int. Cl.
*G06F 9/22*    (2006.01)
*G06F 9/40*    (2006.01)
*G06F 9/44*    (2006.01)
*G06F 15/177*  (2006.01)
*G06F 1/32*    (2006.01)

(52) U.S. Cl. .................. 713/2; 713/1; 713/100; 713/300; 713/323; 713/324

(58) Field of Classification Search ........... 713/1, 713/2, 100, 300, 310, 320, 322, 323, 324, 713/340; 710/14, 8, 62
See application file for complete search history.

(56) References Cited

U.S. PATENT DOCUMENTS

| | | | |
|---|---|---|---|
| 5,142,680 A | 8/1992 | Ottman et al. | 395/700 |
| 5,200,913 A | 4/1993 | Hawkins et al. | 364/708 |
| 5,375,076 A | 12/1994 | Goodrich et al. | 364/708.1 |
| 5,388,248 A * | 2/1995 | Robinson et al. | 711/101 |
| 5,566,349 A | 10/1996 | Trout | 395/840 |
| 5,600,800 A | 2/1997 | Kikinis et al. | 395/281 |
| 5,699,244 A | 12/1997 | Clark, Jr. et al. | 364/420 |
| 5,708,840 A | 1/1998 | Kikinis et al. | 395/800 |
| 5,797,089 A | 8/1998 | Nguyen | 455/403 |
| 5,969,529 A | 10/1999 | Eiraku et al. | 324/433 |
| 5,983,073 A | 11/1999 | Ditzik | 455/11.1 |
| 6,018,724 A | 1/2000 | Arent | 705/44 |

(Continued)

FOREIGN PATENT DOCUMENTS

JP            05233511 A   *   9/1993

OTHER PUBLICATIONS

Loucks, L.; Manikundalam, R.; Rawson, F.L., III, "A microkernel-based operating system for personal digital assistants", Workstation Operating Systems, 1993. Proceedings., Fourth Workshop on , Oct. 14-15, 1993, pp. 9-13.*

*Primary Examiner*—James K Trujillo (57) ABSTRACT

A personal computer (PC) adapted to function as a personal digital assistant (PDA) includes: a central processing unit (CPU) responsive to a control signal to load a first operating system or a second operating system, wherein the first operating system is run by the PC in a first PC mode and the second operating system is run by the PC in a second PDA mode. A method of operating a personal computer (PC) in either a PC mode or a PDA mode is also provided that includes: initiating a control signal; and loading a first or second operating system based on the control signal, wherein the first operating system operates the PC is the first PC mode and the second operating system operates the PC is the second PDA mode.

18 Claims, 5 Drawing Sheets

U.S. PATENT DOCUMENTS

| | | | |
|---|---|---|---|
| 6,034,621 A | 3/2000 | Kaufman | 340/825.44 |
| 6,055,643 A | 4/2000 | Chaiken | 713/323 |
| 6,088,730 A | 7/2000 | Kato et al. | 709/227 |
| 6,101,562 A | 8/2000 | Chang et al. | 710/73 |
| 6,141,052 A | 10/2000 | Fukumitsu et al. | 348/373 |
| 6,151,012 A | 11/2000 | Bullister | 345/168 |
| 6,154,359 A | 11/2000 | Kamikakai et al. | 361/681 |
| 6,173,417 B1 | 1/2001 | Merrill | 714/15 |
| 6,175,917 B1 | 1/2001 | Arrow et al. | 713/1 |
| 6,178,503 B1 | 1/2001 | Madden et al. | 713/2 |
| 6,233,464 B1 | 5/2001 | Chmaytelli | 455/556 |
| 6,240,521 B1 * | 5/2001 | Barber et al. | 713/323 |
| 6,240,550 B1 | 5/2001 | Nathan et al. | 717/11 |
| 6,259,597 B1 | 7/2001 | Anzai et al. | 361/683 |
| 6,272,575 B1 | 8/2001 | Rajchel | 710/102 |
| 6,298,107 B1 | 10/2001 | Mullins | 375/377 |
| 6,304,261 B1 | 10/2001 | Shields et al. | 345/358 |
| 6,310,634 B1 | 10/2001 | Bodnar et al. | 345/854 |
| 6,311,282 B1 | 10/2001 | Nelson et al. | 713/324 |
| 6,334,149 B1 | 12/2001 | Davis, Jr. et al. | 709/219 |
| 6,336,142 B1 | 1/2002 | Kato et al. | 709/227 |
| 6,356,905 B1 | 3/2002 | Gershman et al. | 707/10 |
| 6,367,074 B1 * | 4/2002 | Bates et al. | 713/2 |
| 6,374,315 B1 * | 4/2002 | Okada et al. | 710/62 |
| 6,467,690 B1 * | 10/2002 | Reeves | 235/486 |
| 6,501,999 B1 * | 12/2002 | Cai | 713/340 |
| 6,532,149 B2 * | 3/2003 | Dhar et al. | 361/683 |
| 6,631,469 B1 * | 10/2003 | Silvester | 713/320 |
| 6,778,436 B2 * | 8/2004 | Piau et al. | 365/185.03 |
| 7,030,837 B1 * | 4/2006 | Vong et al. | 345/1.3 |
| 2001/0028562 A1 | 10/2001 | Naghi | 362/85 |
| 2001/0039528 A1 | 11/2001 | Atkinson et al. | 705/37 |
| 2002/0007338 A1 | 1/2002 | Do | 705/37 |
| 2003/0051177 A1 * | 3/2003 | Koo | 713/300 |

* cited by examiner

PERSONAL COMPUTER INTEGRATED WITH PERSONAL DIGITAL ASSISTANT

FIELD OF THE INVENTION

This invention relates to Personal Computers (PCs) and Personal Digital Assistants (PDAs), and more particularly to a PC integrated with PDA functionality permitting a PC to operate in both a PC mode and a PDA mode.

BACKGROUND OF THE INVENTION

Personal Digital Assistants (PDAs) are growing in popularity especially among business travelers. There are a variety of PDAs on the market today that provide a variety of functions. Most PDAs manage personal information and, as such, perform such tasks as: storing contact information such as names, addresses, phone numbers, email addresses, etc.; writing memos or personal notes; keeping track of appointments; reminding a user of appointments, e.g., by audio alarm; planning projects; keeping track of expenses; and the like. In addition, some PDAs are also able to send and receive email, provide Internet access, play MP3 music files, play MPEG movie files, provide voice recording functionality, and provide other functionality.

A PC can also provide all the above PDA functions, where a PC includes a desktop computer or a laptop computer. However, compared to a PC, a PDA is smaller and lighter. As such, it is typically powered by small batteries, e.g., some models use alkaline (AAA) batteries. A PDA's size also enables it to be used practically anywhere. Compared to a PC, a PDA has a fast boot up sequence enabling it to be used within a couple of seconds after turning its power on. In addition, a PDA typically has simpler user input devices than a PC. For instance, PDA applications typically require activation of only a few buttons and don't require a larger, more detailed input device such as a keyboard.

Compared to a PC however, a PDA has several limitations. First, PDAs can be as expensive as a low end PC. Second, PDAs have relatively limited storage capacity given their size, e.g., PDAs cannot support high capacity storage devices such as a hard disk drive. Third, PDAs have limited input devices. For instance, most PDAs include a stylus and touch screen that lets a user launch programs by tapping on the screen with a pen-like stylus. This limits user input speed and makes it difficult to put long messages into the PDA. Fourth, PDAs have limited expansion capability. For instance, flash media card readers and certain universal serial bus (USB) connections may not be supported.

In other words, the advantages of the PDA are normally the drawbacks of a PC and vice versa. Accordingly, there is a need in the art for a PC that overcomes the above deficiencies in the prior art and can provide a PC integrated with PDA functionality that permits a PC to operate in both a PC mode and a PDA mode.

BRIEF SUMMARY OF THE INVENTION

A personal computer (PC) adapted to function as a personal digital assistant (PDA) consistent with the invention includes: a central processing unit (CPU) responsive to a control signal to load a first operating system or a second operating system, wherein the first operating system is run by the PC in a first PC mode and the second operating system is run by the PC in a second PDA mode.

The PC may also have a first boot up sequence for the first operating system that takes longer than a second boot up sequence for the second operating system. The PC operating in PDA mode may run PDA software applications such as scheduling applications, address book applications, and voice recording applications.

A method of operating a personal computer (PC) in either a first personal computer (PC) mode or a second personal digital assistant (PDA) mode consistent with the invention includes the steps of: initiating a control signal; and loading a first or second operating system based on the control signal, wherein the first operating system operates the PC is the first PC mode and the second operating system operates the PC is the second PDA mode.

A personal computer (PC) adapted to function as a personal digital assistant consistent with the invention includes: a central processing unit (CPU); memory; a first operating system configured to control at least the CPU and the memory; and a second operating system configured to control at least the CPU and the memory, the second operating system operating the PC in a personal digital assistant (PDA) mode.

An integrated circuit (IC) for adapting a personal computer (PC) to function as a personal digital assistant (PDA) consistent with the invention includes: an embedded controller; and a system bus interface configured to accept at least one instruction from the embedded controller and provide at least one instruction to the CPU of the PC, where the instruction indicates whether the PC operates in the PC mode or the PDA mode.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
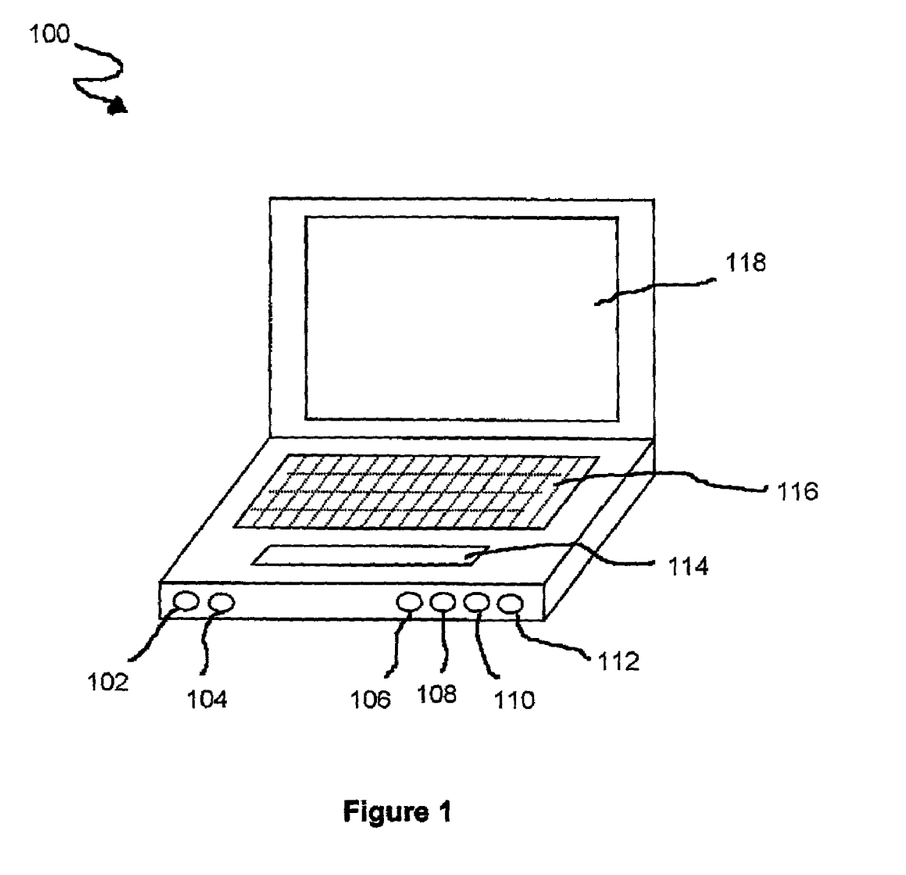
FIG. 1 is a perspective view of an exemplary PC integrated with PDA functionality.

Turning to FIG. 1, a perspective view of a PC 100 consistent with the invention is illustrated. The PC may be a laptop computer as illustrated in FIG. 1 or a desktop computer. For purposes of distinction, a laptop is configured to operate as a portable device and has a stand alone power source while a desktop is configured to operate as a stationary device and does not typically have a stand alone power source.

Advantageously, a PC consistent with the invention is configured to operate in both a PC mode and a PDA mode. In the PC mode, a first operating system, e.g., a PC operating system such as Windows® provided by Microsoft, Inc, of Redmond, Wash., is run. As such, the PC 100 operates as such and can perform any and all of the PC's functions such as word processing, email, Internet access, etc. In PDA mode, a second mini operating system is run. Such a mini operating system (Mini-OS) generally has fewer instructions and takes up less memory than the PC operating system. Such a Mini-OS may be similar to Palm OS® provided by Palm Inc. of Santa Clara Calif., PocketPC provided by Microsoft, Inc. of Redmond, Wash., or MontaVista Linux® provided by Monta Vista Software, Inc, of Sunnyvale, Calif. Such a Mini-OS may take up much less memory than that required for the first operating system such as Windows®. When operating in PDA mode, the Mini-OS and related PDA application software is utilized to provide a smaller subset of PDA functions when compared to PC functions.

Advantageously, booting the Mini-OS for operation in PDA mode takes significantly less time than booting the first operating system for operation in PC mode. This is due in part to the Mini-OS having a smaller kernel and hence a simpler boot up routine than its counterpart PC operating system. This allows a user to access a host of PDA applications much faster than waiting for the longer boot up routine for the first operating system. The Mini-OS may take only a few seconds or less to boot, while the first operating system may take as long as minutes to boot. As such the boot up sequence for the first operating system can be as least five times longer than the boot up sequence for the second operating system, e.g., the Mini-OS.

While in PDA mode, video data may be output on a second video display 114, e.g., a PDA display screen which may be a small LCD module, to display characters and graphics for different PDA applications. The PDA display screen 114 is smaller in size or surface area than the full display screen 118 which is typically utilized when operating the PC in PC mode. The PDA display screen 114 permits power savings since the entire full display screen 118 is not needed when the PC 100 is operating in PDA mode. However, PCs that are not concerned with such a power savings feature or desire the larger display screen 118, may utilize the fall screen 118 in PDA mode. Elimination of the PDA display screen would also reduce initial PC 100 costs.

A PC 100 consistent with the invention may also be provided with PDA buttons 106, 108, 110, 112 to complement typical keys found in a conventional keyboard 116. Four buttons 106, 108, 110, 112 are illustrated in FIG. 1, although there may be any number of buttons depending on the desired functionality. These PDA buttons 106, 108, 110, 112 are similar to the PDA buttons on most PDAs enabling the user to control the PC 100 in PDA mode by using the provided buttons 106, 108, 110, 112 to bring up different PDA applications or screens. The buttons 106, 108, 110, 112 may be any type of buttons such as mechanical push buttons, slide buttons, dial buttons, electrical buttons, etc.

The Mini-OS may be triggered to operate in a variety of ways. For instance, an input device may provide an input mode signal to the PC indicating desired operation in PC mode or PDA mode. One exemplary input device may be power control buttons 102, 104. The first button or PC power on button 102 may be used to initiate a regular boot up sequence of the PC 100 in the PC mode by loading a PC operating system. The second button or PDA power on button 104 may be used to initiate the loading of the Mini-OS for operation in PDA mode. One power button may also be used that could distinguish a PC mode power up request from a PDA mode power up request depending on the time the power on button is depressed. Another way to trigger the loading of the Mini-OS is by coupling electronic devices, e.g., digital cameras, digital camcorders, and the like, to the PC 100 for downloading of digital information.

A traveler who may otherwise travel with a laptop and a PDA may advantageously only take the laptop and still have PDA functionality. Since the PDA functionality is incorporated into the PC 100, it provides a direct link to the PC 100 and various systems of the PC. Hence, coupling of the PDA to a separate PC for transfer of data there between may be avoided. Such a PC 100 also gives the PDA applications access to the PC's more powerful processing circuit and larger mass storage devices, e.g., a hard disk drive, for new PDA applications that could not be supported by a PDA alone.

Figure 2:
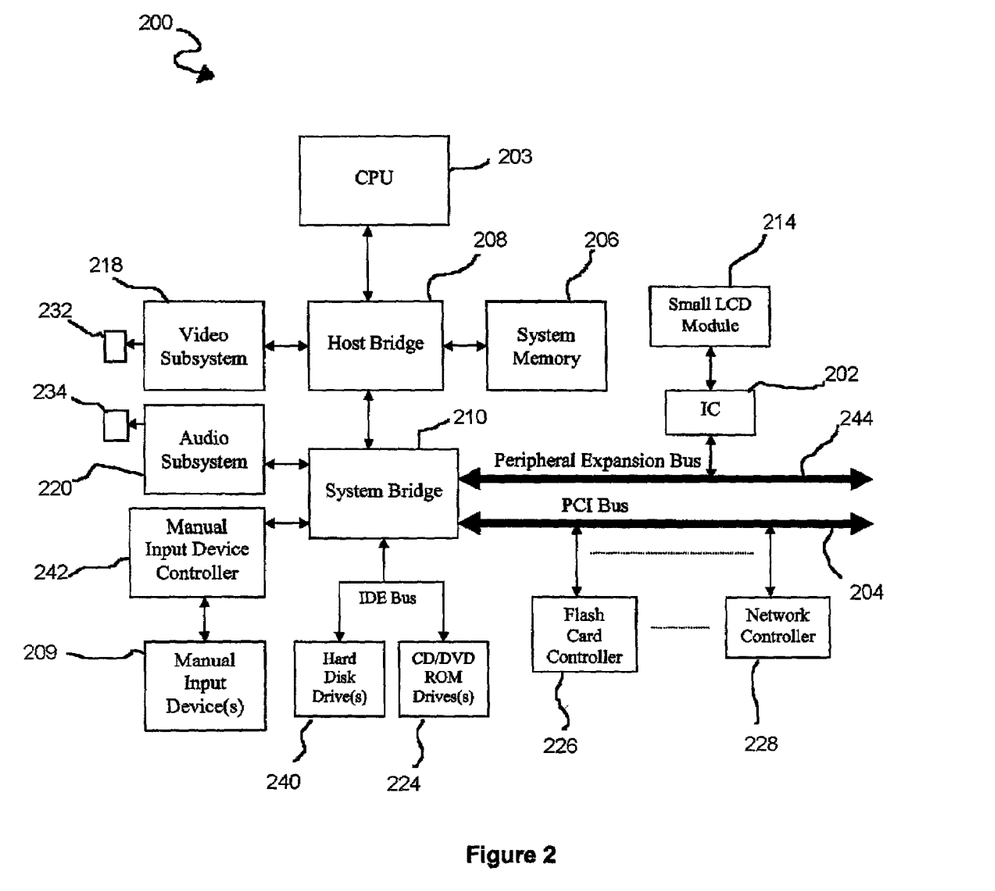
FIG. 2 is a block diagram of a PC consistent with the invention including an integrated circuit (IC) configured to provide PDA functionality to the PC.

Turning to FIG. 2, a simplified block diagram of a PC 200 consistent with the invention including an integrated circuit (IC) 202 configured to provide PDA functionality to the PC is illustrated. The IC 202 is shown directly coupled to the Peripheral Expansion Bus 244, which could be a variety of I/O buses in the PC 200 such as the Universal Serial Bus (USB), High Speed Serial Bus (IEEE 1394), Low Pin Count (LPC) bus, System Management Bus (SMBus), or even the PCI Bus 204. The functionality of the IC 202 may also be embedded in a host of other circuits, e.g., in an embedded keyboard controller or any other manual input device controller 242.

The PC 200 includes a central processing unit (CPU) 203. An exemplary CPU may be, for example, a Pentium processor available from Intel Corporation for executing instructions and controlling operation of the PC 200. The CPU 203 may be coupled to system memory 206 in a conventional manner through the host bridge 208. In turn, the host bridge 208 may be further coupled to the system bridge 210 and PCI bus 204 in a conventional manner. A manual input device controller 242 allows a user to input data to the PC 200 through manual input devices 209 such as a keyboard, mouse, joystick, touch-pad, infrared remote control, and PDA buttons 106, 108, 110, 112 as earlier detailed. The manual input device controller 242 may also be coupled to the PC power on button 102 and PDA power on button 104 functioning as input devices to provide an input signal to the PC indicating desired operation in either PC mode or PDA mode. The PCI bus 204 may be directly coupled to a variety of different controllers for controlling operation of associated peripheral devices. For example, a flash card controller 226, a network controller 228, and others may be directly coupled to the PCI bus 204.

The PC 200 may also include a video subsystem 218 and an audio subsystem 220 which are coupled to the processing circuit 203. A CD/DVD ROM drive 224 may be directly coupled to the system bridge 210 through an integrated drive electronics (IDE) bus in a conventional manner. The drive 224 is configured to read digital data from an external digital storage medium such as a conventional audio CD for audio applications or a conventional DVD for video applications.

The video subsystem 218 and the audio subsystem 220 contain a variety of circuits known to those skilled in the art for interfacing audio and video data with the processing circuit 203 through the system bridge 210 and host bridge 208 such that proper video and audio output can be played on a video output device 232 and audio output device 234 respectively. The video output device 232 may be a CRT, LCD matrix display or the like, while the audio output device 234 may be speakers, headphones, and the like.

An audio input device, e.g., a microphone, may be utilized to input audio data to the audio subsystem 220. The audio and video data to be displayed on the output devices 232, 234 may be obtained from a number of sources including system memory 206, CDs, DVDs, through electronic networking connections from other electronic storage sources, or from the audio input device.

The PC 200 receives power from a power source (not illustrated). For a desktop computer, the power source is typically conventional 120-volt AC power, which is converted to DC power by appropriate AC/DC converters. For a laptop, the power source may be a variety of standalone power sources such as a battery, solar cell, or the like. Batteries may include rechargeable batteries such as lithium, nickel-cadmium, or nickel-metal hydride.

Figure 3:
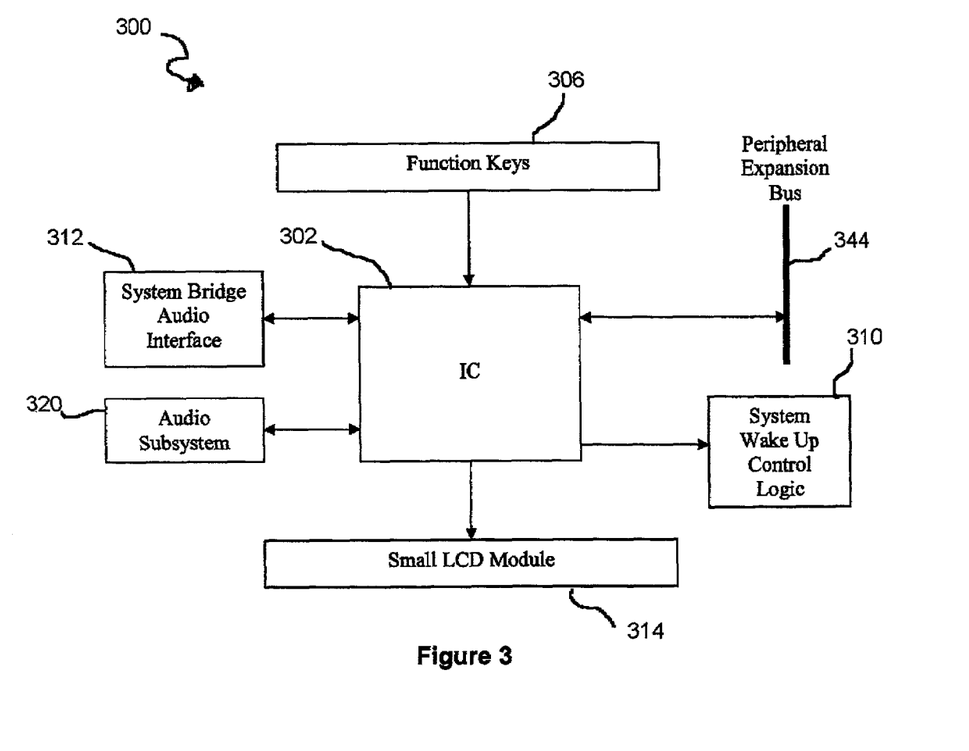
FIG. 3 is a block diagram of one exemplary embodiment for integrating an IC consistent with the invention into a PC to provide PDA functionality to the PC.

Turning to FIG. 3, a block diagram of one exemplary embodiment for integrating an IC 302 consistent with the invention with various PC components of a PC to provide PDA functionality to the PC is illustrated. In general, the IC 302 may be configured to receive input instructions from the function keys 306, to drive a small LCD module 314, and to control the audio interface 312 between the system bridge and the audio subsystem 320 to generate sound effects. The function keys may be the PDA buttons 106, 108, 110, 112 as earlier detailed enabling a user to bring up different PDA applications or screens when the PC is in operating in PDA mode.

As different function keys 306 are activated, an LCD controller interface of the IC send instructions or commands to the small LCD module 308 for different visual effects such as blinking and scrolling to meet different PDA application requirements. Since the LCD module 314 has a surface area that is less than the surface area of the normal size display screen 118, it permits power savings compared to its larger display counterpart 114 typically used in PC operating mode. In addition, further power savings may be realized by having the IC 302 store information in its internal memory, and shutting down the rest of the PC system utilizing the control logic interface 310. Again, the small LCD module 314 may not be required if the larger display screen 118 as illustrated in FIG. 1 is used to display characters and graphics for different PDA applications.

Figure 4:
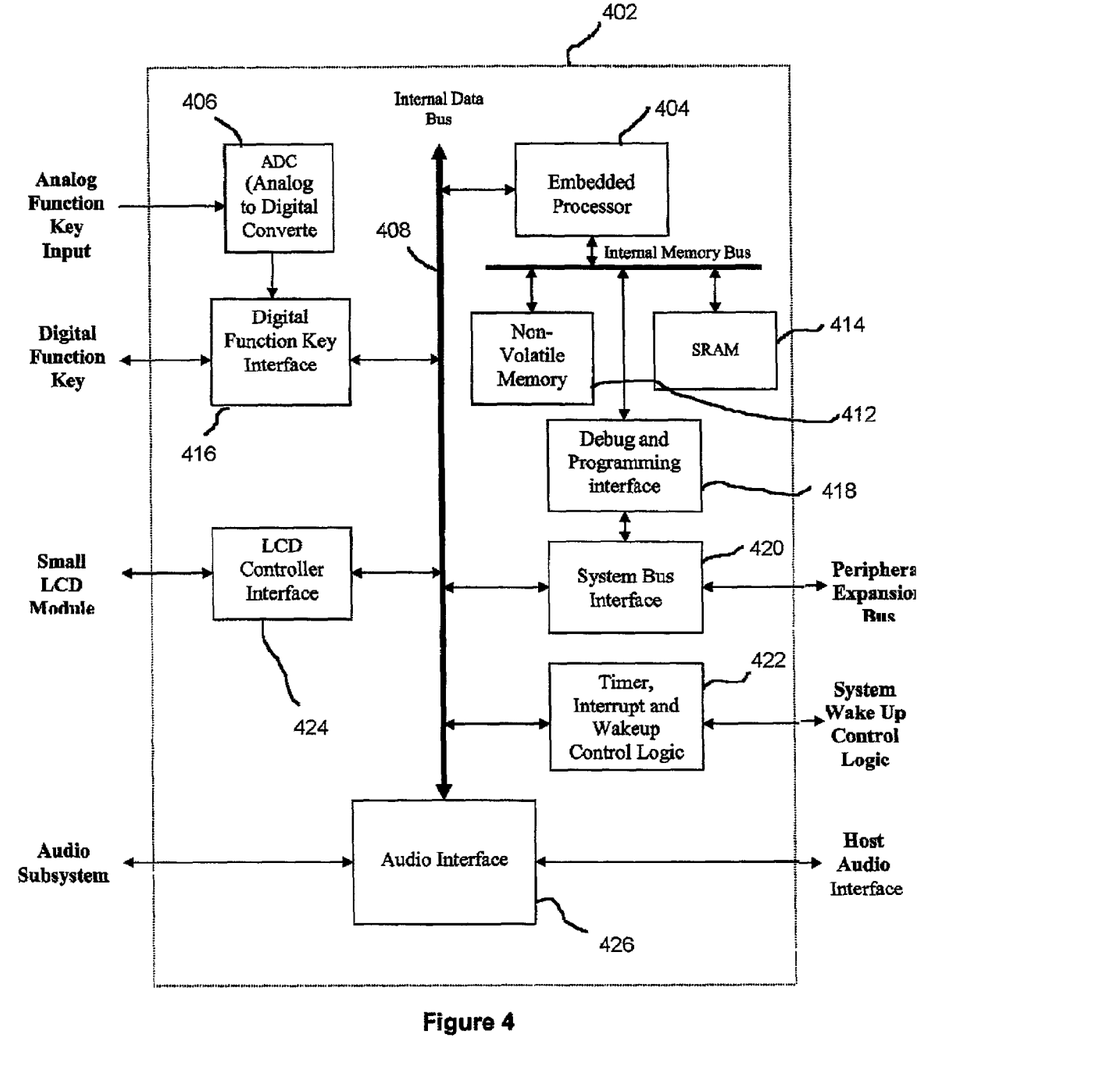
FIG. 4 is a block diagram of one exemplary embodiment of an IC consistent with the invention.

Turning to FIG. 4, one exemplary embodiment of an IC 402 consistent with the invention is illustrated. Those skilled in the art will recognize that there are many other embodiments that may also be implemented in an IC 402 consistent with the invention. The IC 402 may include an embedded processor 404 that functions as the central processing unit for the IC 402. The processor 404 executes commands in the non-volatile memory 412 and controls other internal IC components to perform necessary functions. The non-volatile memory 412 can be EEPROM, Flash Memory, or any type of solid-state memory. Such memory 412 stores programs for the embedded processor 404. The memory 412 content can be changed or re-loaded by the PC system through the system bus interface 420.

Random Access Memory (RAM) 414, e.g., Static RAM (SRAM), may be used to store temporary data or information for the embedded processor 404. A debugging and programming interface 418 may be used by the PC system to control the IC 402 to perform debugging operations or to load new programs in the non-volatile memory 412. Security logic may also be required to prevent any unwelcome attempts to control the IC 402.

An analog to digital converter (ADC) 406 may be used to accept an analog function key input. Such an analog key input may be generated by any variety of analog input devices such as mechanical slide or dial buttons. For example, the PDA buttons 106, 108, 110, 112 may be such buttons. The ADC 406 converts the analog signal to a digital signal and provides the digital signal to the digital function key interface 416, which performs function key decoding.

The digital inputs to the digital function key interface 416 may be originated from the digital function keys or from the ADC 406. The keys may be decoded and sent to the embedded processor 404. If the ADC 406 is utilized, the digital function key interface 416 can be used to generate the key output to the system digital function keys. The keys can be sent to the keyboard controller in the system and generate the scan code for the OS under PC mode.

The LCD controller interface 424 may be used to send video data to the LCD controller on the small LCD module. A generic serial interface may be provided so that the LCD Controller Interface 424 can support different LCD controller vendors. The audio interface 426 may be used to generate the appropriate handshakes between the IC 402 and the audio subsystem during PDA mode. In the PDA mode, the host audio interface signals will be blocked. However, in PC mode, the system host audio interface controls will be directly passed to the audio subsystem 426.

Figure 5:
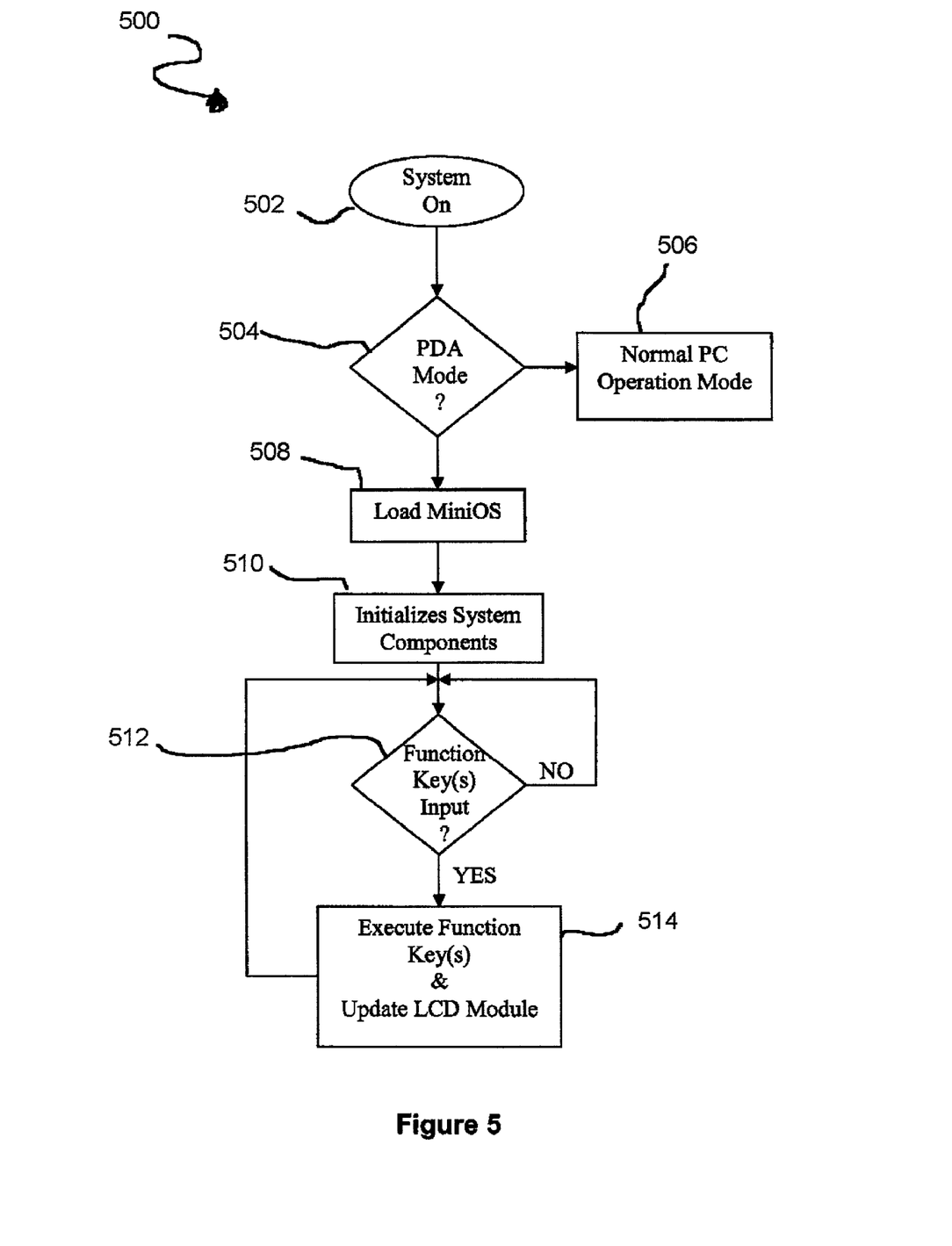
FIG. 5 is a flow chart of an exemplary power up of a mini operating system and initiation of PDA functions in one embodiment of the present invention.

Turning to FIG. 5, in conjunction with FIGS. 3 and 4, an exemplary sequence 500 for the power up of the mini-OS and initiation of PDA functions is illustrated. As illustrated at step 502, the sequence 500 begins when the system is turned on. In step 504, a determination is made whether the PDA operating mode is desired or not. This determination may be made in a number of ways by providing an input mode signal to the PC indicative of the desired operation mode. In one way, the PC may be equipped a PC power on button 102 and a PDA power on button 104 as illustrated in FIG. 1 so that if a user activates the PDA button, it is determined that the PDA mode is desired. Alternatively, if a user activates the PC power up button 102, it is determined that PC mode is desired and the system boots to normal PC operation mode at step 506. Another way of determining whether PDA mode is desired is by automatically booting up the PC in PDA mode if an external digital device, e.g., a digital camera or camcorder is coupled to the PC for downloading of data. Yet another way to determine whether PDA mode is desired is by utilizing the timer control logic 422 portion of the IC 402 to trigger the PDA mode after a certain predetermined time has elapsed. In addition, yet another way to determine whether PDA mode is desired is by utilizing an application program or an operating system that provides such capability.

Once it is determined that the PDA mode is desired, the Mini-OS is loaded 508 in the PC system's memory 206, which may include its RAM. In the next step 510, the mini-OS initializes the system components including one or more of the CPU 203, host bridge 208, system memory 206, and IC 202. The system then waits for input from one of the function keys in the next step 512, until one of the function keys 306 is activated. At this point, the appropriate function is executed and the LCD display module 314 is updated, as appropriate, at step 514. Input signals may also be sent via the conventional keyboard 116 in some instances where so desired, and the output video display is preferably only via the PDA display 114, but may also be on the larger conventional display 118.

Those skilled in the art should recognize that although some of the above-described embodiments utilize a hardware-based OS selection, e.g., by activating the PC power up button 102 or the PDA power up button 104, other OS selection methods are contemplated as well. Such selection methods include, e.g., using a batch file or other scripting software-based method to shut down a first OS and boot to the second OS. Those skilled in the art will also recognize that the Mini-OS of the present invention could conceivably be implemented as part of a larger OS, e.g., a GUI-based OS, such as Windows®, LINUX, etc, or as a software component named something other than an "operating system," e.g., a "driver", an "algorithm", a "script", a "code", a "program", a "routine", a "subroutine", a "utility", etc, instead of being implemented as an entirely separate operating system. Such embodiments are contemplated to be within the scope of the present invention.

Those skilled in the art will also recognize a variety of software applications that may be utilized in the PDA operating mode that provide improvements over that found in traditional PCs or PDAs. Seven such applications include: 1) instant internet access; 2) wireless internet access; 3) scheduling applications; 4) address book applications; 5) low cost storage area for various digital devices; 6) voice recording applications, and 7) remote access. Each of these is addressed in more detail below. Again, this exemplary list is not exclusive and those skilled in the art will recognize a variety of other similar applications where the PDA operating mode of a PC consistent with the invention will provide improvements over that found in traditional PCs or PDAs.

1. Instant Internet Access

With a traditional PC that is off, a user wishing to download information from the Internet must boot up the PC, invoke the internet browser, select the appropriate web site, search the web site for selected materials, and load it into the PC. With a PC including an instant Internet access software application consistent with the invention, the above steps may be simplified. For instance, the computer user may preset web site addresses and selected materials such as news, sport events, weather, stock prices, etc. that the user requires on a more frequent basis when the PC is operating in PC mode. When the PC is off, the user may power up using the PDA power on button 104 that boots the PC very quickly compared to the PC boot up process. The instant Internet software application including the pre-selected web materials instructs the system to the pre-selected web sites and downloads the selected materials if Internet access to the web site is available. The LCD module 314 may display the information downloaded from the various web sites.

The required information to be downloaded from the web site may also be preset in the web site directly. In this case, an identification and authentication process may be required for the web site to properly identify a user. This could be done automatically between the web site and the application software, or by using security devices such as smart cards if highly confidential information is desired. Since the PC accesses the Internet for only a very short period of time in this PDA mode access instance, the non-essential PC components can be automatically turned off after information from the web site is downloaded to conserve power. However, the LCD module 314 may still have power to display the downloaded information which is stored in its internal memory buffer until the system wakes up again after receiving a wake up signal from system wake up control logic 310. Once the PC is woken up, new information from web sites may be downloaded and updated into the internal memory buffer of the LCD module 314.

A similar concept may also be applied to other applications such as downloading emails and instant messages. Application software can also program internal registers of the IC 302 to wake up the PC periodically to get the latest information, emails, or messages.

The audio interface 312 can also be used to provide text-to-voice capability so that end users can listen to emails, messages, or news data without looking into the LCD module 314.

2. Wireless Internet Access

A PC consistent with the invention in PDA mode can also deploy wireless applications such as Bluetooth or 802.11 to access other devices or networks. The PC can boot up in the PDA mode and a wireless internet access software application may enable a user to download emails from a local file server through a wireless Local Area Network (LAN) or the Internet. The user may then use the function keys 306 to print out the emails from a wireless printer.

3. Scheduling Applications

Most PDAs and PCs have a scheduling application that may also be used to provide reminders to a user about previously scheduled events or meetings. The reminder may be an alert message or an audible sound alerting the user that the event or meeting is coming up. However, for such reminder applications to properly function in a traditional PC, the PC has to be kept ON to keep the reminder feature functional. When the PC is a laptop, it would be impractical for battery life to keep the laptop ON solely for this function due to the limited battery capacity. In desktop PCs keeping the desktop on solely for this reminder function would be a drain on power consumption and may also cause an annoying noise from cooling fans of the desktop PC.

Advantageously, scheduling information including dates and times for reminders to issue may be preloaded into the IC 402 and stored in the memory 412 or 414 of the IC 402. As such, the PC may in a deep sleep mode. Internal clock and timer logic 422 may be used to keep track of the date and time when the system is off. When the scheduled time for a reminder is reached, the IC 402 can generate an audible tone or beep through the audio subsystem 320 or the IC 402 can wake up the system and deploy the scheduling software in PC mode. As such, an IC 402 consistent with the invention can provide an efficient way to use a scheduling software application. This is especially true for users who travel with a laptop.

4. Address Book Applications

Most PDAs provide contact information or address book software applications enabling a user to store people's contact information such as name, address, phone number, email, etc. A PC having a PDA mode consistent with the invention provides an easy interface for this type of application. When a user wishes to access or find any of the contact information, the user may turn on the PC in PDA mode, e.g., by activating the PDA power on button 104. Function keys 306 may then be used to ask for the contact information database. Then, the system can load the contact information database into the PC's system memory 206 and let the user search through the database. The system power can be shut down when the search is complete. Since the IC 302 does not need to store any contact information directly, it reduces the die size and cost of the chip. Accordingly, a PC consistent with the invention provides a cost effective solution enabling fast searching of contact information.

5. Storage Hub for Digital Devices

A variety of digital devices such as digital cameras, digital camcorders, portable music players, digital recorders, or the like may store digital data on a variety of storage devices such as flash media cards. Some types of flash media cards include SmartMedia™, CompactFlash™, and Memory Stick® cards. When the flash media card is full, the user typically either removes the full flash media card and inserts a new empty flash media card, or may download the data to an electronic device, e.g., PC, to provide extra room for additional data. Using a PC consistent with this invention, a user may boot up the PC in PDA mode by either using the PDA power up button 104 or the PDA mode may automatically be boot up by coupling the digital device to the PC for downloading.

The user may then utilize a storage software application to select an import function to import the digital data from the digital device to a mass storage device. The mass storage device may be the hard disk drive 240 of the PC or a variety of other storage devices coupled to the PC via a local area network (LAN) or storage area network (SAN). The status of the import function may be displayed on the LCD module 314. After the data is imported from the digital device, the user may erase the associated storage device or flash media card for the next usage. As such, the storage software application provides a simple and easy interface for end users to import digital data without waiting for a long boot up time in PC mode. It also enables the end user to have access to large PC mass storage devices so that the user can avoid paying for additional digital device storage devices or flash media cards. For example, if the digital device is a digital camera, a user can quickly download digital images stored on the digital camera's flash-media card to the PC in the PDA mode. The PDA mode may be automatically triggered when the user couples the digital camera to the PC. The user can change, edit, or process the digital images later in the PC mode.

6. Voice Recording Applications

Voice recording software applications can be quickly provided in PDA mode without the long boot up time of PC mode. For such voice recording applications, an audio input device, e.g., a microphone, can be utilized by an end user to input voice data, which may then be sent to the audio subsystem 320. The voice data will pass to the IC 302 and it may be stored in system memory 206. The CPU 203 may then retrieve the voice data from system memory 206 and utilize a variety of voice coding techniques know to those skilled in the art to perform voice data compression. The final output may then be sent to a mass storage device, e.g., hard disk drive 240, of the PC or it may be sent to a flash media card of an associated voice recorder and player. The status of voice recording such a recording time may be displayed on the LCD module 314. Again, such a voice recording application can be quickly provided in PDA mode without the long boot up time of PC mode.

7. Remote Access

Remote access software applications may programmed so that a PC in PDA mode can send important information such as urgent emails, alert messages, stock market information, etc., to a mobile terminal, e.g., a mobile phone. The information may be sent through a phone line or network cable which is connected to the PC system. This allows the user to access any important messages or information from the user's mobile phone regardless of the location of the PC. A similar concept can also be utilized to allow a mobile terminal to control the PC to access information that the user desires.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A system for adapting a personal computer (PC) to also function as a personal digital assistant (PDA), comprising:
a system CPU and system memory adapted to load and run a first operating system; and
a PDA subsystem separate from said system CPU comprising a processor, a video interface, an audio interface, and internal memory, wherein said PDA subsystem is adapted to run a second operating system independently from said system CPU such that said PC is adapted to function as said PDA, wherein said second operating system comprises a part of said first operating system and wherein said audio interface couples said PDA subsystem to an audio subsystem of said PC in a PDA mode and isolates said PDA subsystem from said audio subsystem of said PC in a PC mode.

2. The system as claimed in claim 1, said PDA subsystem further adapted to control one or more digital storage devices to provide input or output of digital data between said PC and said digital storage device.

3. The system as claimed in claim 2, wherein said digital storage device comprises a flash media device.

4. The system as claimed in claim 2, wherein said PDA subsystem adapted to monitor activity associated with said digital storage device, and to automatically boot up said PC in said PDA mode when said integrated circuit detects the presence of media in a digital device.

5. The system as claimed in claim 2, wherein said digital storage device comprises a memory storing digital photographic data thereon.

6. The system as claimed in claim 1, wherein said system further comprises a button mounted to said PC to activate said PDA subsystem to boot up said PC in a said PDA mode.

7. The system as claimed in claim 1, said system further comprising an LCD screen controlled by said PDA subsystem independently from said system CPU to display information related to a said PDA mode.

8. The system as claimed in claim 1, further comprising a plurality of buttons mounted on said PC for controlling said PDA subsystem in said PDA mode.

9. An integrated circuit adapted to permit a personal computer (PC) system to operate in a personal digital assistant (PDA) mode, comprising:
a PDA subsystem with memory, said PDA subsystem separate from a system CPU which is adapted to run said computer system in a PDA mode running a PDA operating system;
wherein said system CPU is capable of running in a PC mode independently from said PDA subsystem with said memory running in said PDA mode, wherein said PDA operating system is part of a larger PC operating system that is run in said PC mode and wherein said PDA subsystem comprises an audio interface that couple said PDA subsystem to an audio subsystem of said PC in said PDA mode and isolates said PDA subsystem from said audio subsystem of said PC in said PC mode.

10. The integrated circuit as claimed in claim 9, further comprising non-volatile memory for storing said PDA mode operating system.

11. The integrated circuit as claimed in claim 9, further comprising a system bus interface adapted to control one or more digital storage devices to provide input or output of digital data between said PC and said digital storage device.

12. The integrated circuit as claimed in claim 11, wherein said digital storage device comprises a flash media device.

13. The integrated circuit as claimed in claim 11, further comprising an LCD controller interface adapted to control an LCD mounted on said PC to display information related to said PDA mode.

14. The integrated circuit as claimed in claim 11, further comprising a function key interface adapted to monitor one or more buttons mounted on said PC to control the operation of said operating system in said PDA mode.

15. The integrated circuit as claimed in claim 11, wherein said integrated circuit adapted to monitor activity associated with said storage digital device, and to automatically boot up said PC in said PDA mode when said integrated circuit detects the presence of media in said digital storage device.

16. A method of operating a personal computer system (PC) in a personal digital assistant (PDA) mode, said method comprising the steps of:
   running a CPU and memory in a PC operating system; and
   running a PDA subsystem having a processor, a video interface, an audio interface, and internal memory in a PDA operating system, wherein the PDA subsystem is run independent of said CPU such that said PC is adapted to function as said PDA, wherein said PDA operating system comprises a part of said PC operating system and wherein said PDA subsystem comprises an audio interface that couples said PDA subsystem to an audio subsystem of said PC in said PDA mode and isolates said PDA subsystem from said audio subsystem of said PC in a PC mode.

17. The method as claimed in claim 16, further comprising the step of controlling one or more digital storage devices to provide input or output of digital data between said PC and said digital storage device.

18. The method as claimed in claim 16, further comprising the step of, controlling an LCD mounted on said PC to display information related to said PDA mode.

* * * * *